United States Patent [19]
Boshears

[11] Patent Number: 5,572,955
[45] Date of Patent: Nov. 12, 1996

[54] ANIMAL AMUSEMENT AND EXERCISING DEVICE

[75] Inventor: Ricky L. Boshears, Broken Arrow, Okla.

[73] Assignee: Fambo, Inc., Broken Arrow, Okla.

[21] Appl. No.: 272,143

[22] Filed: Jul. 8, 1994

[51] Int. Cl.⁶ .................................................. A01K 29/00
[52] U.S. Cl. ............................ 119/706; 119/707; 446/170
[58] Field of Search .................................... 446/168, 170, 446/171; 119/706–711, 702; 273/109; D30/160

[56] References Cited

U.S. PATENT DOCUMENTS

| | | | |
|---|---|---|---|
| D. 335,553 | 5/1993 | Conner | D30/160 |
| D. 345,633 | 3/1994 | McCance | D30/160 |
| D. 348,124 | 6/1994 | O'Rourke | D30/160 |
| 1,976,234 | 10/1934 | Larson | D30/160 |
| 2,112,316 | 3/1938 | Turner | D30/160 |
| 2,198,075 | 4/1940 | Borek | D30/160 |
| 2,292,540 | 8/1942 | Norton | D30/160 |
| 2,894,487 | 7/1959 | Goldson | D30/160 |
| 2,931,131 | 4/1960 | Morse | 446/168 |
| 3,060,627 | 10/1962 | Seretny | 446/170 |
| 3,486,485 | 12/1969 | Kahanick | 119/706 |
| 3,552,356 | 1/1971 | Rosenthal . | |
| 3,638,350 | 1/1972 | Wiggen | 446/168 |
| 3,648,403 | 3/1972 | Gommel . | |
| 4,036,178 | 7/1977 | Lee et al. . | |
| 4,040,520 | 8/1977 | Joaquin . | |
| 4,154,018 | 5/1979 | Churchman | 273/109 X |
| 4,720,283 | 1/1988 | Williams et al. | 446/419 X |
| 4,722,299 | 2/1988 | Mohr | 119/707 |
| 4,969,417 | 11/1990 | Sakano . | |
| 5,009,193 | 4/1991 | Gordon | 119/711 |
| 5,269,261 | 12/1993 | McCance | 119/706 |

FOREIGN PATENT DOCUMENTS

| | | |
|---|---|---|
| 499626 | 2/1954 | Canada . |
| 664618 | 5/1979 | U.S.S.R. . |
| WO8704046 | 7/1987 | WIPO . |

Primary Examiner—Mickey Yu
Attorney, Agent, or Firm—Learman & McCulloch

[57] ABSTRACT

An animal amusement and exercise device comprises an annular body having spaced apart, overlying flanges forming a laterally open, endless track for the accommodation of a freely rotatable ball. The body defines a cavity in which a compressible pad of material removably may be accommodated. Each of the devices includes connectors for removably coupling such device with another like device in vertically stacked relation. The track of each device is accessible from outside each device thereby enabling one or more animals to have access to all of the tracks.

18 Claims, 3 Drawing Sheets

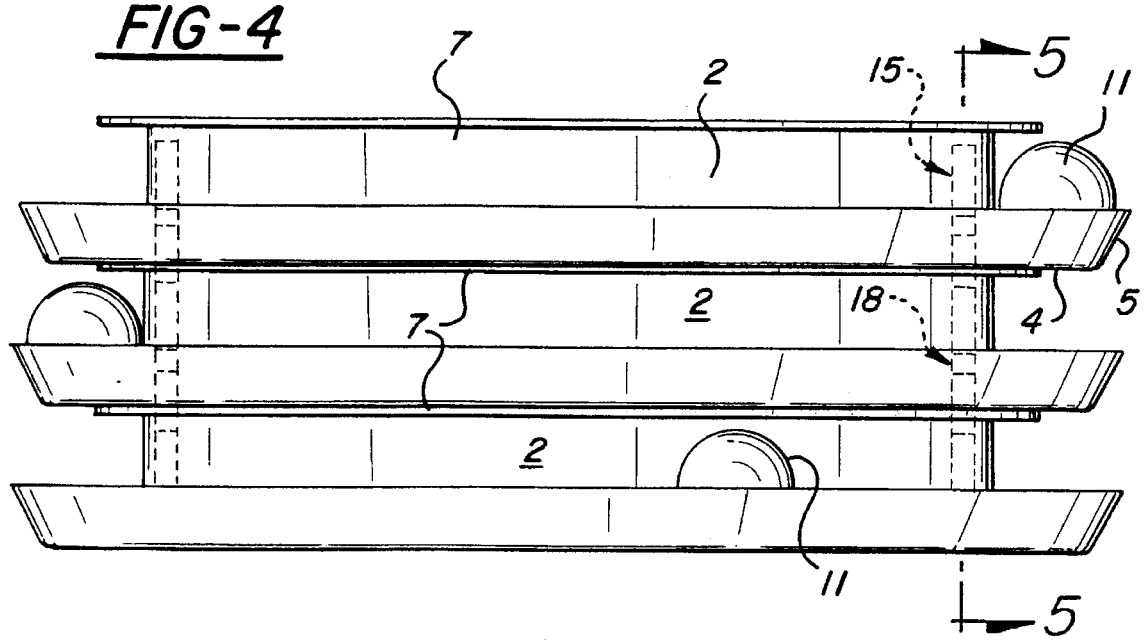
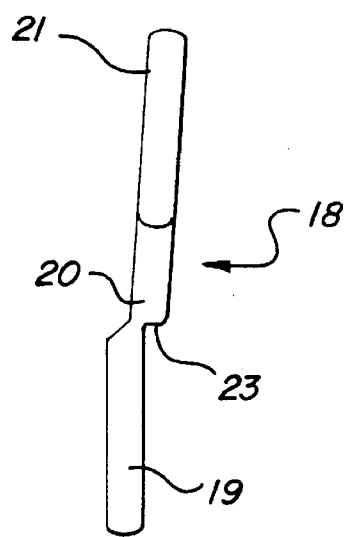
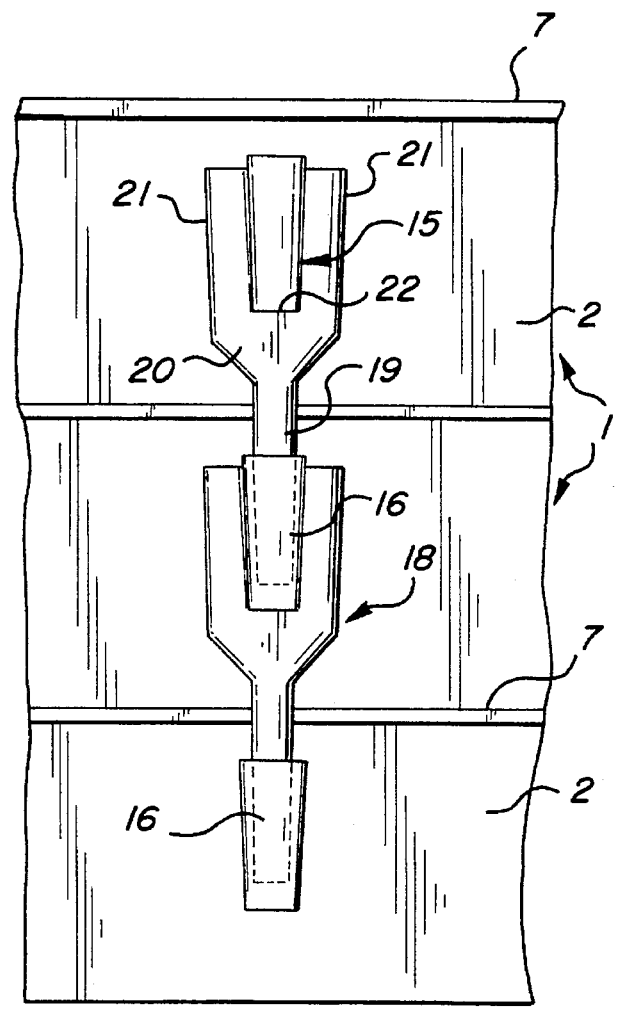

ANIMAL AMUSEMENT AND EXERCISING DEVICE

This invention relates to a device that is especially adapted to amuse and provide exercise for an animal such as a domestic cat.

BACKGROUND OF THE INVENTION

Devices for amusing and exercising domestic animals such as cats are in wide usage. Many of the known devices include endless tracks along which a ball may be propelled by a cat and a pad of material which the cat may claw. Some of the known devices have a ball-accommodating track which opens toward the interior of the device, whereas others have such tracks opening upwardly. In either case the stacking of one device upon another prevents access to visibility of more than a single track.

Many households have more than one cat. Since more than one cat may wish to use the device at the same time, it is desirable to provide stackable devices which will enable each cat to have access to a different track so as to propel the ball therein independently of the other cat or cats. However, in those instances in which the pet owner does not desire more than one device, it is desirable to provide a device which offers no obstruction to the free use of the device by a single cat.

SUMMARY OF THE INVENTION

An animal amusement and exercise device constructed in accordance with the invention comprises an upstanding, annular wall defining a circular body having an open top and bottom cavity for the accommodation of a compressible pad of shreddable material. The bottom of the annular wall is joined to an outwardly extending flange which terminates at its outer end in an upwardly and outwardly inclined lip. A second flange is joined to the upper edge of the annular wall and extends both outwardly and inwardly beyond the wall. The inner edge of the upper flange overlies and provides a stop for the pad of material, whereas the outer edge of the upper flange overlies a portion of the lower flange and forms an endless track for the accommodation of a spherical ball. The space between the outer edge of the upper flange and the free edge of the lip is less than the diameter of the ball, but either or both of the upper flange and the lip are sufficiently flexible to enable the ball to be moved into and out of the track.

The device includes sockets carried by the annular wall and projecting inwardly of the cavity so as to compress the adjacent portions of the pad to assist in holding the latter in place. Each socket also may accommodate the stem of an upstanding connector, the opposite end of which terminates in a fork which may be used to support and embrace the socket of a second device which is stacked upon the lower device.

Since the track of each device is accessible from the exterior of each body, a plurality of cats may have access to each of a plurality of balls in the corresponding plurality of tracks, thereby providing amusement and exercise to one or more cats.

THE DRAWINGS

A preferred embodiment of the invention is disclosed in the accompanying drawings, wherein:

FIG. 4 is an elevational view showing three like devices stacked one upon another;

FIG. 5 is an enlarged sectional view taken on the line 5—5 of FIG. 4; and

FIG. 6 is an elevational view of a connector.

THE PREFERRED EMBODIMENT

Figure 1:
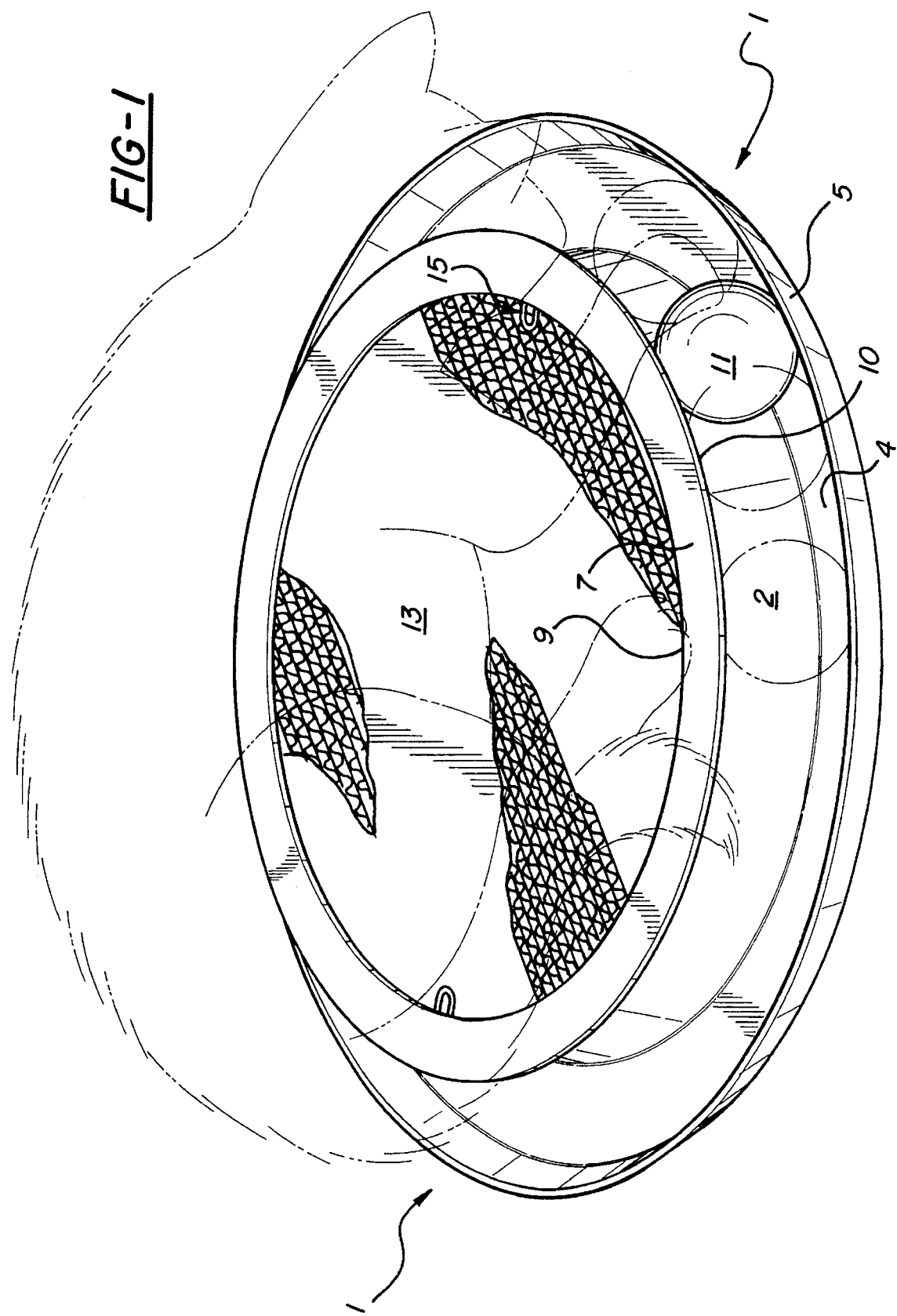
FIG. 1 is an isometric view of a single device and illustrating in phantom lines a cat lying atop the device and propelling a ball along a track.

An amusement and exercise device constructed in accordance with the invention is designated generally by the reference character 1 formed of a suitable plastic material having some resiliency and flexibility. The device comprises an upstanding, annular wall 2 defining a circular cavity 3 open at both its top and bottom. The lower end of the wall 2 is joined to an outwardly extending flange 4 which terminates at its outer end in an upwardly and outwardly inclined lip 5. The upper end of the wall 2 terminates in an outwardly extending projection 6.

Connected to the wall 2 at its upper end is an upper flange 7 having a depending, L-shaped retainer member 8 which, together with the projection 6, provides means for removably securing the flange 7 to the wall 2. The flange 7 has an inner edge 9 which overlies the peripheral edge of the cavity 3 and an outer edge 10 which overlies and is spaced from the lower flange 4. The spacing between the flanges 4 and 7 is sufficient to accommodate freely a spherical ball 11 in a track 12 defined by the wall 2, the flanges 4 and 7, and the lip 5. The diameter of the ball 11 is slightly greater than the spacing between the free edges of the flange 7 and the lip 5, but either or both of the flange and lip are sufficiently flexible, as is indicated in chain lines in FIG. 3, to enable the ball to deflect the flange or lip and move into and out of the track 12.

Removably accommodated in the cavity 3 is a yieldably compressive pad 13 of shreddable material such as corrugated paper. The height of the pad 13 preferably corresponds to the height of the cavity, thereby providing a relatively thick pad. The pad is intended to be shredded by the claws of a cat. Since corrugated paper is relatively porous a thin, imperforate membrane 14 of paper or other suitable material is adhered to the bottom of the pad 13 so as to prevent shredded particles from passing through the pad 13 and out the bottom of the cavity.

Figure 2:
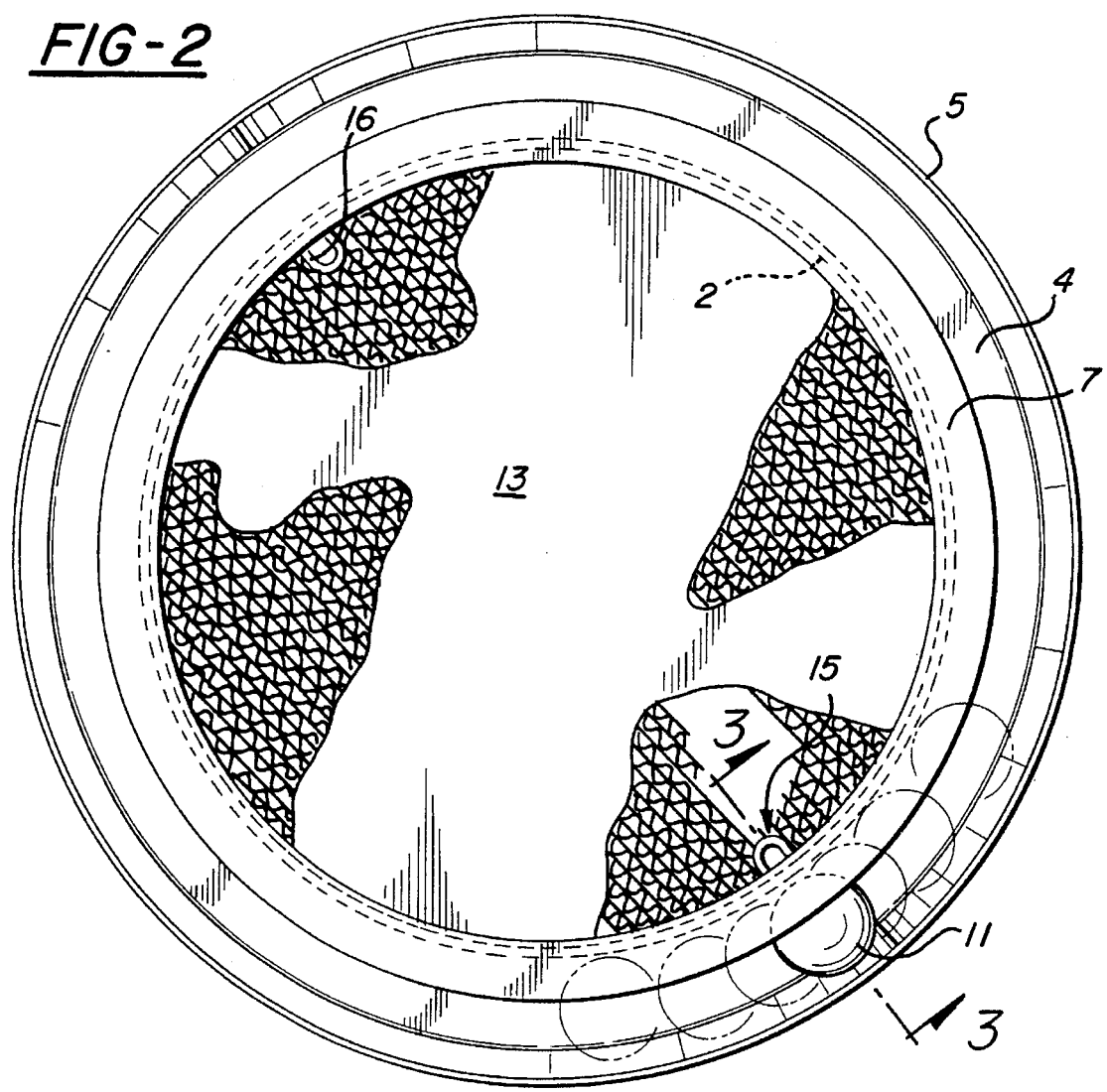
FIG. 2 is a plan view of the device shown in FIG. 1, with the pad shown only fragmentarily.
Figure 3:
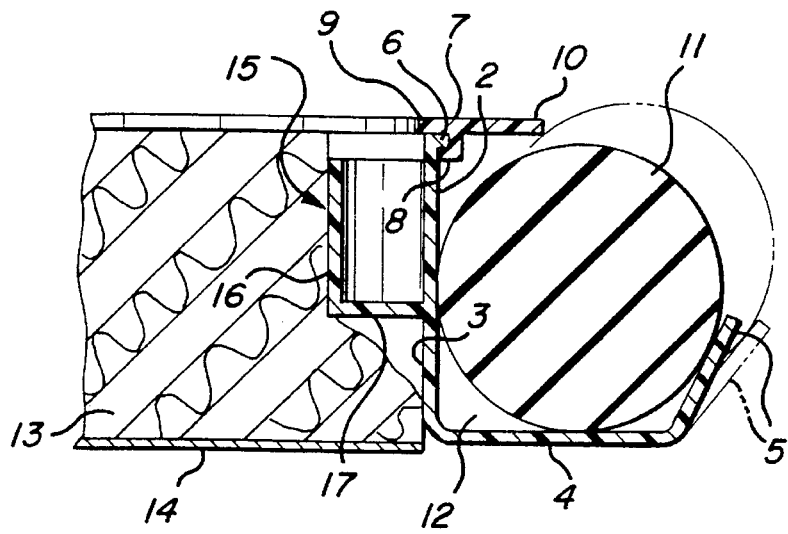
FIG. 3 is an enlarged, sectional view taken on the line 3—3 of FIG. 2.

The device 1 is intended to be stackable with like devices. To enable attainment of this objective one or more sockets 15 are secured to the inner surface of the wall 2 so as to project into the cavity 3. Each socket is defined by a side wall 16 and a bottom wall 17, but is open at its upper end. Preferably, the upper end of the socket terminates short of the upper end of the wall 2. As is best shown in FIGS. 2 and 3, the projection of each of the sockets into the cavity 3 causes those portions of the pad 13 adjacent the sockets to be compressed. The compression of the pad by the sockets prevents relative rotation of the pad and the housing and, in addition, applies a frictional force on the pad to restrain its falling out of the cavity 3 through the bottom thereof.

Coupling means is provided for securing two adjacent devices 1 in stacked relation one upon another. The coupling means comprises the socket 15 and a connector 18 having at its lower end a stem 19 that is adapted for removable accommodation in a socket. The stem 19 is joined to a fork 20 having two limbs 21 spaced from one another a distance sufficient to accommodate the socket 15 of the upper device 1 therebetween as is shown in FIG. 5. Between the limbs 21 is a base 22 on which the bottom wall 17 of the socket 15 may rest. Since the inner edge 9 of the flange 7 overlies the peripheral edge of the cavity 3, the stem 19 is offset from the fork 20 so as to provide a shoulder 23 which may rest upon the upper surface of the flange 7.

A single device 1 may be used to amuse and exercise a cat shown in chain lines in FIG. 1 or a plurality of devices may be stacked one upon another as is shown in FIG. 5. In either instance, a pad 13 will be accessible to a cat and the ball occupying each track also will be accessible to one or more cats.

Among the advantages of the construction is that, even though a cat may lie upon the pad 13 of the single or uppermost device 1, the ball in the associated track not only will be accessible to the cat, but also may be seen by the cat inasmuch as the upper flange 7 terminates short of the lower flange 4 and the lip 5.

Another advantage of the disclosed construction is that a cat may lie upon the pad 13 of the single or uppermost device, as shown in FIG. 1, but no part of the cat, such as the tail or a paw, necessarily will extend into the track and obstruct movement of the ball therein. This is because each track opens laterally or transversely of the associated device, rather than upwardly.

The disclosed embodiment is representative of a presently preferred form of the invention, but is intended to be illustrative, rather than definitive thereof. The invention is defined in the claims.

I claim:

1. An animal amusement and exercising device comprising a body having an upstanding annular wall having lower and upper ends; a lower flange joined to and extending outwardly from the lower end of said wall and terminating at its outer edge in an upturned lip member, said wall, said lower flange and said lip member together forming an endless, unobstructed track for the accommodation of a spherical ball; an upper flange member joined to and extending outwardly from the upper end of said wall and substantially parallel to said lower flange, said upper flange member overlying said lower flange and having a width less than that of said lower flange so that said track extends outwardly beyond said upper flange member; and coupling means carried by said wall for enabling said body to be stacked and removably secured with a like body.

2. A device according to claim 1 including a spherical ball in said track and wherein said upper flange member and said lip member have marginal edges spaced from one another a distance less than the diameter of said ball.

3. A device according to claim 2 wherein at least one of said flange and lip members is sufficiently flexible to enable movement of said ball through the space therebetween.

4. A device according to claim 1 wherein said body has a cavity formed by said wall.

5. A device according to claim 4 including a pad of shreddable, compressible material removably occupying said cavity.

6. A device according to claim 4 wherein said upper flange member has a projection which extends inwardly of said wall and partially overlies said cavity.

7. A device according to claim 6 wherein said cavity has no bottom and including a pad removably occupying said cavity and abutting said projection.

8. A device according to claim 7 wherein said pad has a height corresponding substantially to that of said wall.

9. A device according to claim 7 wherein said pad has upper and lower surfaces and an imperforate membrane secured to said lower surface.

10. A device according to claim 1 wherein said coupling means comprises at least one socket carried by said wall and a connector accommodated in said socket and extending above said wall for engagement with the socket of a like body supported on said upper flange member.

11. A device according to claim 10 wherein said socket is hollow and wherein said connector has at at least one end thereof a stem removably accommodated in said socket.

12. A device according to claim 11 wherein said connector has at its other end a fork in which the socket of a like body removably may be accommodated.

13. A device according to claim 1 wherein said wall has at its upper end a lateral projection and wherein said upper flange member has an inner end, and a retainer at said inner end in which said lateral projection is accommodated.

14. A device according to claim 13 wherein said lateral projection is removably accommodated in said retainer.

15. An animal amusement and exercise device comprising an annular, upstanding wall defining a body having a cavity open at its top and bottom; a lower flange secured to said wall at its lower end and extending outwardly therefrom, said lower flange terminating at its outer edge in an upwardly and outwardly inclined lip member, said wall, said lower flange, and said lip member together defining an endless track; a spherical ball rotatably accommodated in said track; an upper flange member secured to said wall at its upper end and projecting both outwardly and inwardly of said cavity, said upper flange member overlying said lower flange and being spaced from said lower flange a distance greater than the diameter of said ball, said upper flange member terminating short of said lip member to provide a space between said members less than the diameter of said ball, at least one of said upper flange and lip members being sufficiently flexible to enable said ball to flex said one of said members and pass through said space into and out of said track; at least one socket carried by said wall within said cavity; a pad of yieldably compressible material occupying said cavity and being compressed laterally by said socket for retaining said pad in said cavity; and coupling means carried by said socket for removably coupling said device to a like device.

16. The device according to claim 15 wherein said upper flange member and said wall have cooperable means for separably joining said upper flange member to said wall.

17. The device according to claim 15 wherein said coupling means comprises a connector having a stem at one end thereof accommodated in said socket, said connector having its other end extending above said upper flange member for connection to the socket of said like device.

18. The device according to claim 17 wherein said other end of said connector comprises a fork bearing upon and embracing the socket of said like device.

* * * * *